Jan. 17, 1956   E. N. BRODEN ET AL   2,731,083
METHOD AND MACHINE FOR CUTTING RUBBER THREAD WITH
THE CUTTING ACTION PERIODICALLY INTERRUPTED
Filed March 6, 1951   3 Sheets-Sheet 1
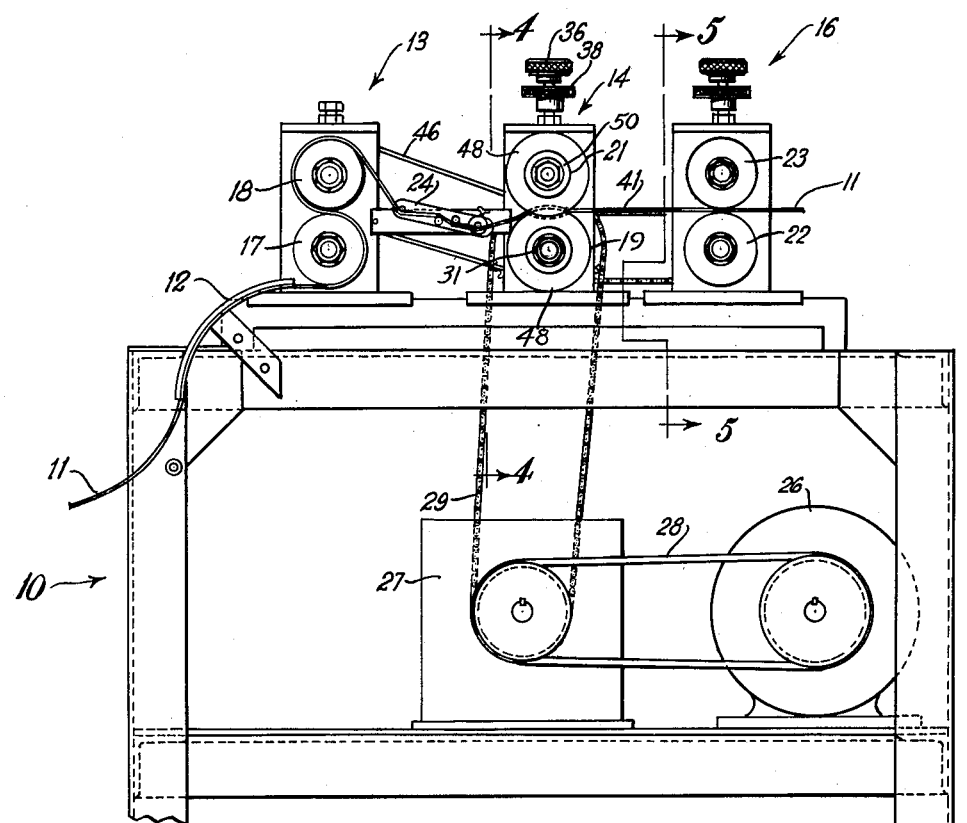
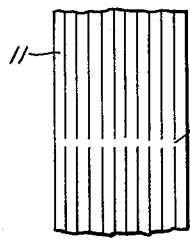
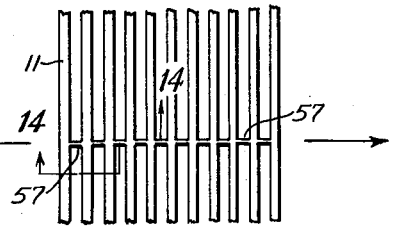
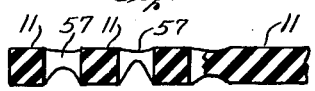
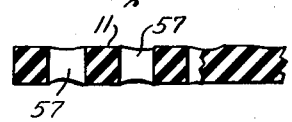
INVENTORS
EDWIN N. BRODEN &
ROBERT A. MACAYEAL
BY
ATTORNEYS

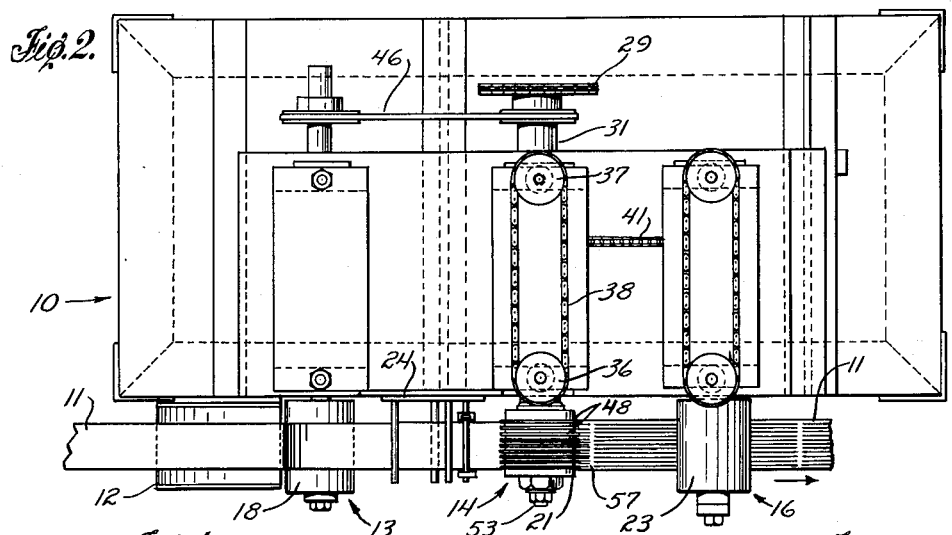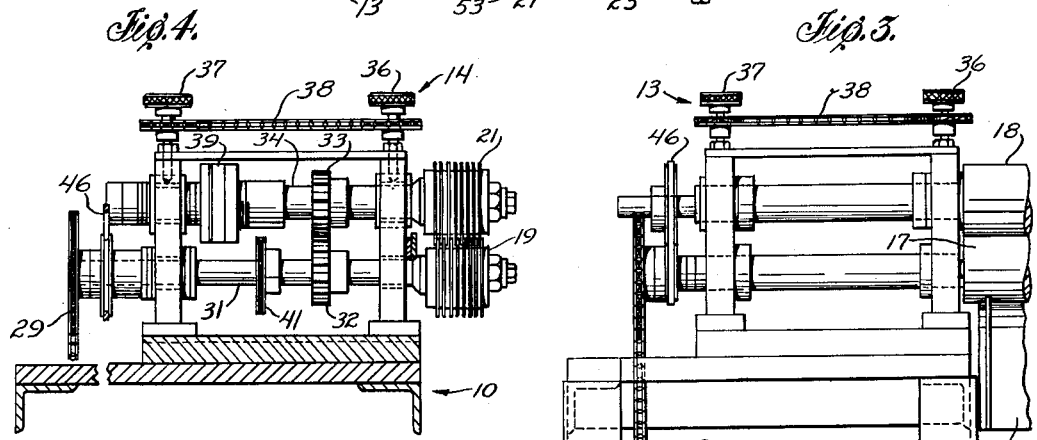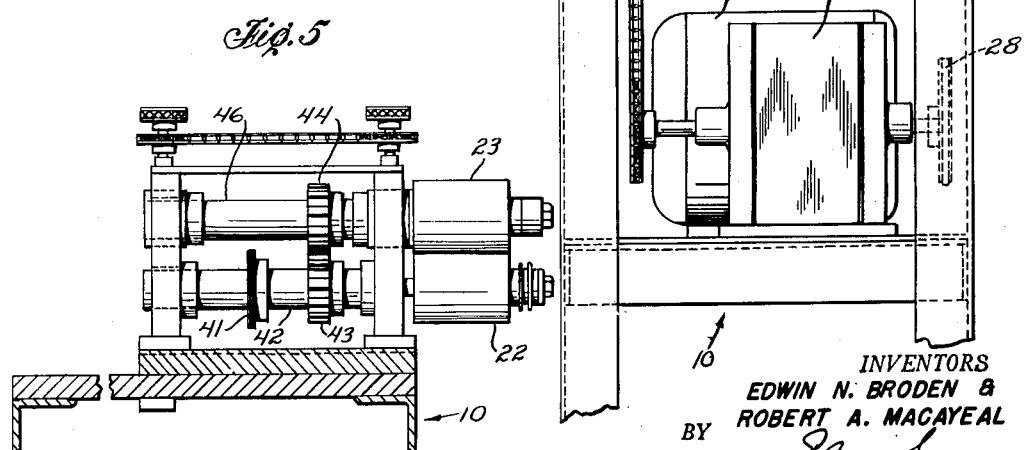

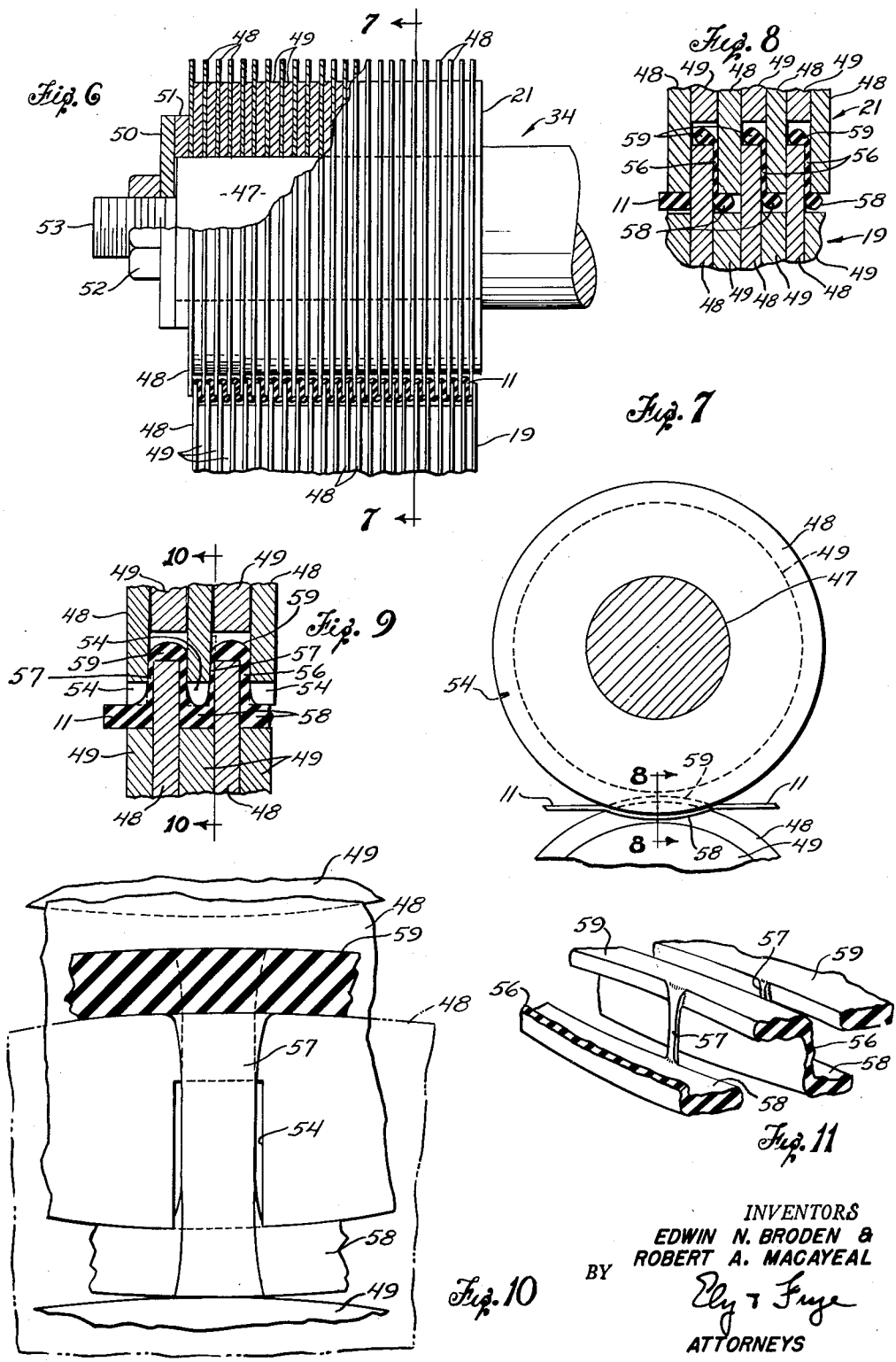

United States Patent Office 2,731,083
Patented Jan. 17, 1956

2,731,083

METHOD AND MACHINE FOR CUTTING RUBBER THREAD WITH THE CUTTING ACTION PERIODICALLY INTERRUPTED

Edwin N. Broden, Assonet, Mass., and Robert A. Mac-Ayeal, Tiverton, R. I., assignors to The Firestone Tire & Rubber Company, Akron, Ohio, a corporation of Ohio Application March 6, 1951, Serial No. 214,173

5 Claims. (Cl. 164—17)

This invention relates to the cutting of rubber sheet into a plurality of rubber threads, and the present application is a continuation in part of our co-pending application, Serial No. 138,190, filed January 12, 1950, now abandoned.

Heretofore, following the cutting operation, rubber thread has been placed on spools or beams for shipment or storage. The spooling operations involve considerable expense with respect to labor and equipment. Attempts have been made to feed the thread directly into a container and ship it in unwound condition, but the thread becomes tangled to the extent that the labor involved in untangling it more than offsets the savings effected in eliminating the spooling.

One use of beam-loaded threads is in connection with so-called "covering machine," wherein textile threads are helically wound on the rubber thread, each beam containing a plurality of separate threads, which are fed simultaneously into the machine. The largest beams in practical use hold about seven pounds of rubber thread. In one example, this amounts to a length of about 150 yards for each thread. At a covering machine of average rate of output, this means that the beam will be exhausted about every 1½ hours. Installing another loaded beam involves tying the ends of each thread to the tail end of a thread from the prior beam. This operation takes about one half hour, during which output of the machine is at a standstill. Using the thread of the present invention, there is no need for stoppage to tie in thread ends, and the covering machine may work at capacity until the spools of textile threads are exhausted. Thus the machine may run for 24 hours without interruption.

The quality of end products is also improved by the present invention, involving knots at intervals of 1500 yards or more, rather than 150 yards as formerly. For instance, in making garter material, knots are objectionable and must be cut out. Using the beam method there are fifty such knots for every beam used.

Briefly, the present invention provides for cutting rubber thread from a ribbon or sheet in such manner that the cutting action is interrupted periodically, leaving transverse regions of uncut ribbon which serve to retain the ribbon-like form, so that the thread may be packed directly in a box without tangling, and which threads are easily separated in a continuous operation which tears the webs holding the threads together.

It is, therefore, an object of the invention to avoid tangling of rubber thread, so that it may be packed directly into a container, without spooling or the like. A further object is to minimize interruptions, such as those due to tying operations in fabricating materials from rubber thread. Yet another object is to improve the quality of articles fabricated from rubber thread, a related object being to provide supplies of rubber thread in plurality for simultaneous working, wherein the tension in the separate strands is equalized.

These and other ends, which will be apparent to those skilled in the art, are realized by the present invention, an embodiment of which is described in the following specification and illustrated in the drawings, in which:

Fig. 1 is a front, elevational view of a thread-cutting machine of the type employing rotary, circular knives, Fig. 2 is a top plan view of the machine of Fig. 1, Fig. 3 is an end elevational view of the machine of Fig. 1, as seen from the left of that figure, Fig. 4 is a sectional view taken along the line 4—4 of Fig. 1, Fig. 5 is a sectional view taken along the line 5—5 of Fig. 1, Fig. 6 is an enlarged view of the two sets of rotary knives, as viewed edgewise of the knives from the right in Fig. 1, and showing the rubber sheet or ribbon sectioned at the vertical plane through the axes of the shafts of the rotary knives.

Fig. 7 is a sectional view taken on the line 7—7 of Fig. 6,

Fig. 8 is a sectional view, enlarged, taken along the line 8—8 of Fig. 7,

Fig. 9 is a view similar to Fig. 8, showing conditions when the peripheral slot in the upper knife is at the "six o'clock" position, Fig. 10 is a sectional view, enlarged, taken on the line 10—10 of Fig. 9, Fig. 11 is a perspective view of the rubber thread in the condition illustrated in Figs. 9 and 10, with the rotary knives omitted, Fig. 12 is a plan view of a section of cut ribbon, showing one transverse, uncut zone, Fig. 13 is a view similar to Fig. 12, showing the ribbon stretched transversely, as indicated by the arrows.

Fig. 14 is a sectional view taken on the line 14—14 of Fig. 13, and

Fig. 15 is a view similar to Fig. 14 showing possible variations in condition of the integrating webs in the ribbon of rubber threads.

Referring to the drawings by characters of reference, there is shown, in Figs. 1 to 5, a thread-cutting machine mounted on a table indicated generally by the numeral 10, which may be of any convenient construction. Disc cutters for rubber thread are more or less conventional, such apparatus being shown here merely for a complete understanding of the manner of employment of the novel cutting discs of the invention. The machine need not, therefore, be described in minute detail.

The ribbon 11, which is to be cut, passes over an arcuate guide 12, around guide rollers at a station 13, and between the cutting rollers at a station 14, and the cut ribbon 11 passes between rollers at a station 16, being positively driven at each station.

At station 13 is mounted a pair of driven rollers 17, 18, at station 14, a pair of driven rollers 19, 21, each mounting a series of cutting discs, and at station 16 a pair of driven rollers 22, 23. The ribbon, after passing over guideway 12, passes around roller 17, between rollers 17, 18, around roller 18, alternately along tensioning guide pins on a bar 24, between rollers 19, 21, where it is cut into threads, thence between rollers 22, 23, from where it is fed into a shipping or storage container.

The main drive is from a motor 26 driving a speed reducer 27 through a belt 28. From the speed reducer, a chain 29 drives a shaft 31 mounting lower roller 19. A gear 32 on shaft 31 meshes with a gear 33 on shaft 34 mounting the upper roller 21, so that the knives on rollers 19 and 21 are rotated in opposite directions.

As will be later described in detail, the cutting discs overlap and the amount of overlap is regulated by moving shaft 34 by means of screws 36, 37, which are moved in unison by a chain 38. Also, the amount of pressure between the overlapping portions of the knives is regulable by a threaded telescoping arrangement on shaft 34 shown generally at 39, which may have any convenient form.

A chain 41 communicates drive from shaft 31 to the shaft 42 bearing roller 22, and a gear 43 on shaft 42 meshes with a gear 44 on the shaft 46 of roller 23 whereby rollers 22, 23 are positively driven in opposite directions. Roller 18 is driven by a belt 46 leading from shaft 31.

As previously stated, the foregoing structure is conventional, and will be well understood by those skilled in the art, so that further detailed description is unnecessary.

The cutter assembly, comprising upper and lower members 21 and 19, is shown in detail in Fig. 6. Each comprises a reduced portion 47 on their respective shafts 34 and 31, on which are mounted a series of cutting rings 48, alternating with spacing rings 49. The rings are secured in place on the shaft by washers 50, 51, held by a nut 52 threaded on a reduced end 53 of the shaft.

As seen in Figs. 7, 9, and 10, the cutting rings of the upper units are each provided with a radial notch 54 at their peripheries with the depth of the notch less than the greatest radial overlap of the cutting rings. The overlap of the knife rings is also apparent in Fig. 7. Each cut along the ribbon takes place in a plane common to the mutually contacting faces of the overlapping knives. The distance between adjacent slits in the ribbon will be equal to the distance between adjacent pairs of such planes, or equal to the thickness of one spacing ring plus the thickness of one knife. In passing through the overlapping parts of the knives, each individual cut thread will assume the general position shown in Fig. 7, with respective edges following the peripheries of the knives, and is thus urged radially inwardly toward the respective spacer rings, which latter have a sufficiently small diameter to provide a clearance accommodating the displaced edges of the thread. A portion 56 of the thread, joining the two ends, is highly deformed at this point, but is not cut, and when the thread emerges it is generally rectangular in cross section. However, when the peripheral notches 54 pass into the overlapping area of the knives, cutting is interrupted for a distance along the ribbon, roughly corresponding to the width of the notch 54. The mechanics of cutting thread with the rotary knives is not entirely understood, but certain details of the interrupted action of the present cutters may be fairly deduced. Since the ribbon emerges with a laterally extending zone intact, it follows that the condition shown in Fig. 7, in the zone of knife overlap, cannot exist adjacent the slots 54. Therefore, there must be a connecting film 57 of the rubber material leading from lower portion 58 of one deformed thread to the upper portion 59 of the adjacent thread. This film passes between the contacting knives and although the knives are adjusted into close contact, the film 57 is very thin and the knives are yieldable against the relatively thick, connecting films 56 in the rubber thread body. The depth of slots 54 and the amount of overlap are such that the film 57, although highly elongated, nevertheless passes through the knives without being stretched to the rupture point. Thus, when a slot passes into overlapping relation with a lower knife, it permits an unsheared portion of the sheet to pass between the knives, and from the point of entry this unsheared portion, having a width equal to that of the slot, is gradually elongated between the periphery of a lower knife and the bottom of the slot in an upper knife, until the point of maximum overlap is reached, and thereafter the elongation of this portion is reduced until it emerges from the knives in the form of a web which integrates a pair of adjacent threads.

It has been observed in actual practice that the situation illustrated in Fig. 14 is not always realized, and the zone of interrupted cutting may be partially slit as shown in Fig. 15. However, even these partial slits leave sufficient uncut rubber to keep the threads united.

In a typical example of a ring-form knife according to the invention, the outer diameter is 3 inches, the inner diameter 1.5 inches, and the thickness 0.009 inch. The peripheral slot is 0.004 inch wide and 0.031 inch deep. The dimensions of the slot are so small that the slot is scarcely discernible and it has been found expedient to place a mark on the knife to designate the location of the slot. The depth of the slot should be from 0.008 to 0.010 inch greater than the thickness of the ribbon. The spacers have an outer diameter of 2⅝ inches and, in practice, have varied in width from 0.013 to 0.030 inch, depending on the width of thread being cut.

The overlap of the knives has ranged from 1/32 inch to 1/16 inch depending upon the thickness of the ribbon, which in practice has ranged from 0.010 to 0.035 inch. It has been noted that the amount of overlap also affects the width of the uncut webs, the latter diminishing as the overlap is increased. The optimum amount of overlap is best determined by trial.

With a view to the ultimate separation of the threads, the width of the slot should be as small as possible, consistent with resistance of the integrating webs to accidental tearing. A slot width of 0.004 inch has given satisfactory and consistent results. Possibly an even smaller width would also be satisfactory, but forming such a narrow slot in the knife is attended with great difficulty.

While the present invention offers benefits to the manufacturer of the rubber thread in respect to handling, packing and shipping, the greatest benefits are realized by the manufacturer who uses the thread in connection with further processing. Some of these benefits have been referred to above. In the ribbon form, all threads partake of equal tension, which is not the case where separate threads are wound on beams. Furthermore, as threads are unwound from a beam, the overall tension increases as the threads are payed out, due to the decreasing radius of the supply on the beam. In cutting rubber thread by any method, very long sheets of material are employed, and the quality is consistent throughout any one sheet. By the present invention, larger lots may be packed in a container and thus more material from a given sheet is available at one time to the consumer. These benefits may be further extended since ribbon from the same sheet may be packed in a plurality of containers which may each be marked with a number indicating the sheet from which the ribbon is taken.

While only one slot has been shown, a plurality of slots may be provided on a disc, if desired, and slots may be provided on the lower disc as well as the upper disc. Also, while the slots have been shown as aligned in the series of discs, this is not strictly necessary.

Generally speaking, whereas a preferred form of the invention has been shown and described, the invention is not limited thereby since changes may be made without departing from the scope thereof.

What is claimed is:

1. A cutter for rubber thread or the like comprising two cutter assemblies each having a plurality of axially spaced square edged cutting discs, a radially disposed surface of each individual disc of one assembly overlapping and contacting a radially disposed surface of one of the discs of the other assembly to form cooperating cutting pairs providing areas of mutual contact whereby to provide shearing action on a ribbon of rubbery material fed therethrough, each cutting pair spaced from the next axially adjacent cutting pair, and a slot having a depth less than the radial extend of said contacting surface in the peripheral edge of at least one of the discs of each cutting pair.

2. A cutter for rubber thread or the like comprising two cutter assemblies each having a plurality of axially spaced square edged cutting discs, a radially disposed surface of each individual disc of one assembly overlapping and contacting a radially disposed surface of one of the discs of the other assembly to form cooperating cutting pairs providing areas of mutual contact having a radial height of from .031 to .062 inch whereby to provide shearing action on a ribbon of rubbery material fed therethrough, each cutting pair spaced from the next axially adjacent cutting pair, and a slot having a depth less than the radial extend of said contacting surface in the peripheral edge of at least one of the discs of each cutting pair.

3. A cutter for rubber thread or the like comprising two cutter assemblies each having a plurality of axially spaced square edged cutting discs, a radially disposed surface of each individual disc of one assembly overlapping and contacting a radially disposed surface of one of the discs of the other assembly to form cooperating cutting pairs providing areas of mutual contact having a radial height of from .031 to .062 inch whereby to provide shearing action on a ribbon of rubbery material fed therethrough, each cutting pair spaced from the next axially adjacent cutting pair, and a slot having a depth of from .008 to .010 inch greater than the thickness of the thread being cut but less than said radial height in the peripheral edge of at least one of the discs of each cutting pair.

4. A method of manufacturing rubber thread comprising the steps of shearing a rubber sheet of uniform thickness between the overlapping, radially disposed contacting surface areas of two gangs of rotating, axially spaced square edged cutting discs, and periodically interrupting the shear of said discs by reducing the amount of contact of said surfaces by a radial distance from .008 to .010 inch greater than the thickness of said sheet but less than said overlap whereby to provide a bridge of rubber between adjacent threads.

5. A method of manufacturing rubber thread having a thickness of from .010 to .035 inch comprising the steps of shearing a rubber sheet having a uniform thickness of from .010 to .035 inch between the overlapping, radially disposed contacting surface areas of two gangs of rotating, axially spaced square edged cutting discs, and periodically interrupting the shear of said discs by reducing the amount of contact of said surfaces by a slot in said discs having a radial distance of from .008 to .010 inch greater than the thickness of the thread being cut but less than the overlap of said discs.

References Cited in the file of this patent

UNITED STATES PATENTS

| Number | Name | Date |
|---|---|---|
| 478,023 | Rohan | June 28, 1892 |
| 654,248 | Hager | July 24, 1900 |
| 782,977 | Madden | Feb. 21, 1905 |
| 1,181,354 | Stevens | May 2, 1916 |
| 1,373,668 | Pearsall | Apr. 5, 1921 |
| 1,418,115 | Wheeler | May 30, 1922 |
| 1,422,901 | Terry | July 18, 1922 |
| 1,949,066 | Warner | Feb. 27, 1934 |
| 1,994,137 | Leguillon | Mar. 12, 1935 |
| 2,185,885 | Bruker et al. | Jan. 2, 1940 |
| 2,236,366 | Chapman et al. | Mar. 25, 1941 |
| 2,238,422 | Marcin | Apr. 15, 1941 |
| 2,294,966 | Dreyfus | Sept. 8, 1942 |
| 2,337,525 | Peik | Dec. 21, 1943 |
| 2,446,198 | Socke | Aug. 3, 1948 |
| 2,480,721 | Egenolf et al. | Aug. 30, 1949 |
| 2,567,634 | Bosshard | Sept. 11, 1951 |